(12) United States Patent  
Verduyn

(10) Patent No.: US 8,491,032 B1
(45) Date of Patent: Jul. 23, 2013

(54) RETRACTABLE TARP SYSTEM WITH AUTOMATED CLOSING MECHANISM

(75) Inventor: Lloyd Verduyn, Hamilton (CA)

(73) Assignee: VTI Holdings, Inc., Detroit, MI (US)

( * ) Notice: Subject to any disclaimer, the term of this patent is extended or adjusted under 35 U.S.C. 154(b) by 0 days.

(21) Appl. No.: 13/548,804

(22) Filed: Jul. 13, 2012

(51) Int. Cl.
*B60P 7/04* (2006.01)

(52) U.S. Cl.
USPC .............................. 296/100.12; 296/100.01

(58) Field of Classification Search
USPC ............. 296/100.01, 100.11, 100.12, 100.15, 296/100.16
See application file for complete search history.

(56) References Cited

U.S. PATENT DOCUMENTS

| | | | |
|---|---|---|---|
| 1,037,502 A | 9/1912 | Lowell | |
| 1,627,716 A | 5/1927 | Teachout | |
| 1,863,957 A | 6/1932 | Woolcott | |
| 3,425,742 A | 2/1969 | Rauber, Jr. | |
| 3,586,365 A | 6/1971 | Dickson et al. | |
| 4,169,616 A | 10/1979 | Peterson | |
| 4,252,363 A | 2/1981 | Rodrigue | |
| 4,285,539 A | 8/1981 | Cole | |
| 4,844,109 A | 7/1989 | Navarro | |
| 5,102,182 A | 4/1992 | Haddad, Jr. | |
| 5,152,575 A | 10/1992 | DeMonte et al. | |
| 5,269,586 A | 12/1993 | Hahn et al. | |
| 5,538,313 A | 7/1996 | Henning | |
| 5,607,200 A | 3/1997 | Smidler | |
| 5,772,275 A | 6/1998 | Tokarz | |
| 5,924,759 A | 7/1999 | DeMonte et al. | |
| 5,957,231 A * | 9/1999 | Conaway et al. | 180/89.14 |
| 6,065,796 A | 5/2000 | Verduyn | |
| 6,089,058 A | 7/2000 | Elpern et al. | |
| 6,109,283 A | 8/2000 | Burke et al. | |
| 6,139,085 A | 10/2000 | Templin et al. | |
| 6,183,036 B1 | 2/2001 | Coulson | |
| 6,312,040 B1 | 11/2001 | Shinohara | |
| 6,616,211 B2 | 9/2003 | Cramaro | |
| 6,883,860 B1 * | 4/2005 | Budge | 296/190.08 |
| 6,905,161 B2 | 6/2005 | Fliege et al. | |
| 7,111,862 B1 * | 9/2006 | Eng | 280/438.1 |
| 7,249,796 B2 * | 7/2007 | Henning | 296/105 |
| 7,458,629 B2 | 12/2008 | Smith et al. | |
| 2009/0108622 A1 | 4/2009 | Damsi et al. | |
| 2009/0167057 A1 * | 7/2009 | Walter et al. | 296/190.03 |
| 2011/0175390 A1 | 7/2011 | Verduyn | |

FOREIGN PATENT DOCUMENTS

| | | |
|---|---|---|
| FR | 2653478 | 4/1991 |
| GB | 2126644 | 3/1984 |
| GB | 2199549 | 7/1988 |
| WO | WO 9401299 | 1/1994 |

* cited by examiner

*Primary Examiner* — Lori Lyjak
(74) *Attorney, Agent, or Firm* — Miller Canfield Paddock and Stone, P.L.C.; Timothy Engling

(57) ABSTRACT

A retractable tarp system having automated closing mechanisms used in conjunction with the front and rear of a truck or vehicle-pulled trailer. The automated system of closing the tarping system may include air cylinders, hydraulics or electric motor with closing mechanisms for the dual closing system. The rear system may include linear actuators on each side adapted to pull a cable with a distal hook that may selectively engage the tarp structure. For redundancy, the front system may be air-operated while the rear system is electric. The truck driver operates a switch or button to open and close the closing mechanisms of the retractable tarp system, and may connect and disconnect a hook on a rear closing mechanism that pulls the tarp tightly closed.

14 Claims, 10 Drawing Sheets

RETRACTABLE TARP SYSTEM WITH AUTOMATED CLOSING MECHANISM

FIELD OF THE DISCLOSURE

This disclosure relates to a retractable tarp system with dual automated closing mechanisms. More specifically, the tarp system includes a release and tensioning system to operate the closing mechanisms in conjunction with a deck, such as on vehicle-pulled trailer.

BACKGROUND

Trucks include rigid truck and trucks adapted to pull trailers, both enclosed and open, for transporting goods and materials. Certain trucks, sometimes called tractor units, are used to pull various types of open trailers, including flat bed, drop deck, double drops and removable goosenecks (RGNs). Items being shipped can readily be loaded on the deck or cargo bed of a trailer, which for certain goods can be loaded more easily than through a rear door of an enclosed fixed-wall trailer.

On flat bed trailers, fasteners, such as tie downs, can be used to hold freight, cargo and equipment during transport. Various types of straps, such a ratchet straps and winch straps, are used to tie down items being shipped on a trailer. Tie downs are often webbing outfitted with attachment hardware. Standard tie downs include feeding straps and chain through rail pockets or a rubber seal. Such tied down cargo or equipment can be exposed on the cargo bed or deck of a trailer.

Tarp systems for flat bed trailers include tarps placed over shipping items tied down by rubber straps or ropes. Preferably, flat bed trailers have retractable tarp systems that slide along tracks on each side of the flat bed deck, which may enclose the freight, cargo or equipment.

Flat bed tractor trailers having a retractable tarping system can transport a wide variety of freight, much of which freight cannot be loaded into conventional van-type transport trailers having in-situ walls and roof. The tarping system includes a tarpaulin supported by numerous vertically disposed frame members that span across the bed of the trailer and are attached at each of their opposite free ends to a respective trolley having rollers that engage an elongate track disposed along each side of the trailer. The trollies are manually urged along the elongate tracks to move the tarp system between its trailer enclosing configuration and its open configuration.

U.S. Pat. No. 6,065,796, which is incorporated herein by reference, discloses a track and trolley assembly for use with a tarpaulin enclosing system on a flat bed trailer defining a central longitudinal axis and having a bed portion defined by left and right lateral side edges. The track and trolley assembly comprises a plurality of trollies for operatively supporting the tarpaulin enclosing system, each trolley having a frame member, at least one weight-bearing roller mounted on the frame member for rotation about a substantially horizontal axis and at least one stabilizing roller mounted on the frame member for rotation about a substantially vertical axis. An elongate track has a length, a substantially vertical trailer mounting face, a substantially horizontal weight-bearing roller receiving surface disposed along the length of the elongate track, and at least one substantially vertical stabilizing roller receiving surface disposed along the length of the elongate track. A rail is disposed substantially along the length of the elongate track and has a length, a substantially vertical trailer mounting face, and a hook-receiving rail portion disposed in laterally outwardly projecting cantilever relation from the trailer mounting face so as to be free and clear of the substantially vertical trailer mounting face, and disposed above the substantially horizontal weight-bearing roller receiving surface of the elongate track and above the at least one substantially vertical stabilizing roller receiving surface of the elongate track, for receiving at least one tie-down hook in releasably retained relation therealong. The trollies move along the elongate track such that the frame members of the trollies are disposed horizontally outboard of the hook-receiving rail portion of the rail.

U.S. Publication 2011-0175390 for Retractable Tarp System with Dual Automated Opening/Closing Mechanisms by the same inventor was published on Jul. 21, 2011, less than one year before the present filing. It is incorporated by reference. Aspects of the front system may be prior art based on sales, such as FIG. 3, but the disclosed rear closure system and dual operation are not believed to be prior art.

Trucks have electrical power, often with 24 volt batteries, that can operate accessories when hooked up to the truck. Also, trucks and trailers often have air cylinders of compressed air systems to operate air brake or other systems, which may include tanks to hold compressed air. Trucks also have hydraulic systems. These pneumatic and hydraulic systems have not been fully integrated with flatbed, drop deck, double drops and RGN trailer tarp systems.

SUMMARY

The present disclosure provides a retractable tarp system with dual automated front and rear closing mechanisms. The retractable tarp system includes a tarp structure adapted to slide or roll on a track on a side of the deck to enclose cargo on the deck, such as a curtain-sided trailer. The tarp system may includes a release and tensioning system using electricity, air or hydraulics or a combination to operate the front closing mechanism in conjunction with a headboard of a truck/trailer and a complementary rear system in conjunction with rear posts extending from the trailer bed.

The automated system of opening and closing the tarping system preferably uses air cylinders to operate a guide for the front closing mechanism. An air cylinder has a piston rod attached to the guide or attachment means; wherein an attachment means, such as a guide, is slideable relative to the tarp structure. A front hook can extend from the tarp structure with an end that engages the guide so the front hook cooperates with the guide to secure the tarp structure to the headboard. Air cylinders can run off a trailer's compressed air supply system. Conversely, the hooks can be attached to the guide mechanism that is attached to the air cylinder and the receiving mechanism can be attached to the front of the tarp structure.

Air systems to operate may be preferred to operate both the front and rear closing systems, but in extreme weather the air tanks can freeze or otherwise not operate at ideal levels. Thus, a dual system where one closing mechanism can run off air and the second system can run off electricity or hydraulics can provide redundancy to ensure that the tarp can retract under all practical conditions. As such, the front closing mechanism can operate with front air pistons (with an air system relatively close in standard trucks, which can be heated if needed) and the rear closing mechanism can operate with electric linear actuators controlled by motor powered from the truck battery via standard thick gage cables.

The preferred rear system can have linear actuator on each rear side of the truck bed, preferably secured on respective posts, that uses a linear actuator with a cable and hook to provide rearward tension on the tarp structure. Pulling the tarp to the rear will tighten the tarp so no ripples or waves exist, which can improve gas mileage, aerodynamics, wear on the system, and noise reduction. In addition to longer lasting tarp systems, the reduction in rocking and blowing can be safer while driving. As is well known in the trucking industry, there is a shortage of drivers and the average age of the drivers is getting higher and higher and these older drivers are not as agile and mobile as they once were. Any device that enables the drivers to do their job easier is much appreciated and will help companies attract more and better drivers. The FMCSA (Federal Motor Carriers Safety Administration) has implemented the CSA 2010 rules to make trucking safer. Part of these rules limit the time a driver is allowed to spend at work each day. Since loading and unloading are part of this time, any device that allows the drivers to spend less time loading and unloading, and more time driving and being productive, will be seen as a valuable asset to the trucking industry. This device will enable them to do the loading and unloading quicker and more efficiently, getting them on the road faster. This rear closure is especially effective with a front closure system that also secures the tarp and allows the front hook to be slightly pulled close with tension on the tightened tarp structure.

The dual system has switches, such as toggles or buttons, that are preferably together at the front of the truck bed. Another benefit to the driver is less walking and faster operation to both make life easier and save time for the driver.

A truck driver needs only to operate a switch to open and close each closing mechanism of the retractable tarp system. A front system can have the air cylinder hooked up to a rod with an upper and lower hook that connects to two receiving devices on the tarp structure. The rear system can be electric with a linear actuator on each side pulling a cable connected to a hook that removably secures to the tarp structure on the respective side.

BRIEF DESCRIPTION OF THE DRAWINGS

The above-mentioned and other features of this disclosure and the manner of obtaining them will become more apparent, and the disclosure itself will be best understood by reference to the following descriptions of systems taken in conjunction with the accompanying figures, which are given as non-limiting examples only, in which.

The exemplifications set out herein illustrate embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiments in different forms, the figures show, and herein described in detail, embodiments with the understanding that the present descriptions are to be considered exemplifications of the principles of the disclosure and are not intended to be exhaustive or to limit the disclosure to the details of construction and the arrangements of components set forth in the following description or illustrated in the figures.

Figure 1:
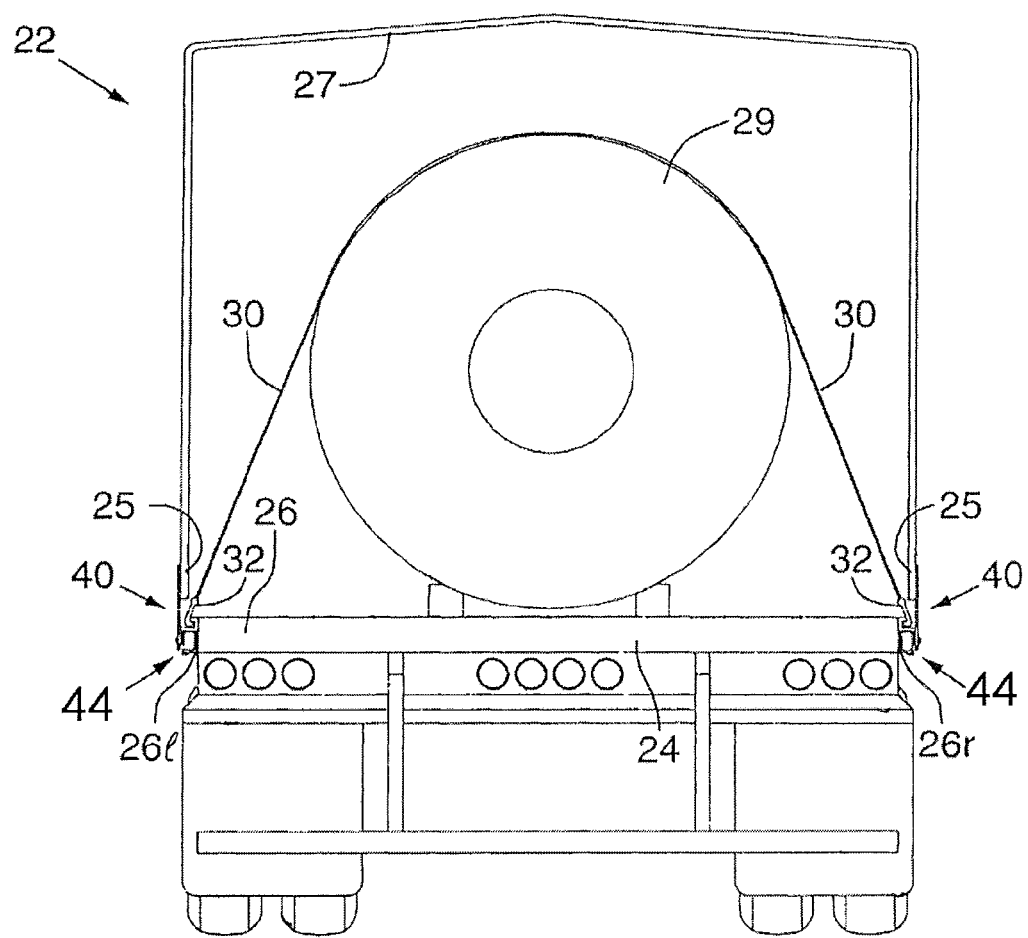
FIG. 1 shows a rear end elevational view of a prior art flat bed trailer having a retractable tarp system, with the tarp system drawn over the trailer enclosing freight.
Figure 2:
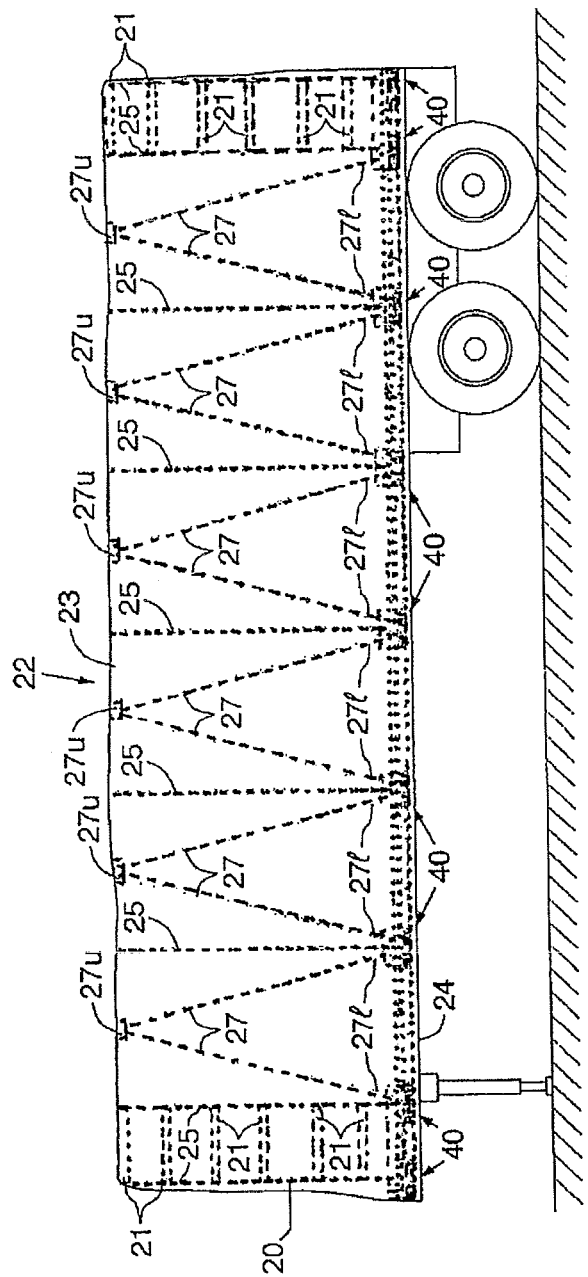
FIG. 2 shows a side elevational view of the prior art flat bed trailer having a retractable tarp system.

FIGS. 1 and 2 show a headboard 20 generally known in the art associated with a retractable tarp structure 22 both on a truck or a vehicle-pulled trailer, preferably a flat bed trailer 24. A flat bed trailer 24 has a bed portion 26 laterally defined by left 26-*l* and right 26-*r* outwardly facing lateral side edges. The tarp structure 22 includes a pliable tarp 23, such as 20 oz. vinyl fabric with an acrylic finish, mounted on and supported by a plurality of inverted "U"-shaped rib members 25, which preferably have 6" curve on cast aluminum corners for strength and aerodynamics. Adjacent rib members 25 are operatively interconnected by spar members 27 pivotally connected at their lower ends 27-*l* to trollies 40. Preferred tarp lifters can be connected to bows, not the trollies, preferably with a plate forming a cart 42, adapted to move in a track 44, and are pivotally connected one to the next at their upper ends 27*u*. Tarp lifters sometimes are not connected at the top, but they meet the tarp and are wrapped in a sleeve to hold them in place. The two most forward and the two most rearward "U"-shaped rib members 25 can be respectively secured to each other by lateral reinforcing ribs 21.

Tie-down straps 30 have a tie-down hook 32 disposed at each opposite end to hold to secure cargo or any load 29 to the bed portion or deck 26 of the flat bed trailer 24 or truck. Standard tie-down straps can be used. The tie down can also be built into the track 44, wherein the tied-down cargo 29 and straps 30 can be completed enclosed within the tarp structure 22.

Trollies 40 operatively support the tarp structure 22 that encloses the cargo 29. The trollies 40 are disposed along both the left 26-*l* and right 26-*r* side edges of the bed portion 26 of the flat bed trailer 24 or truck.

Figure 3:
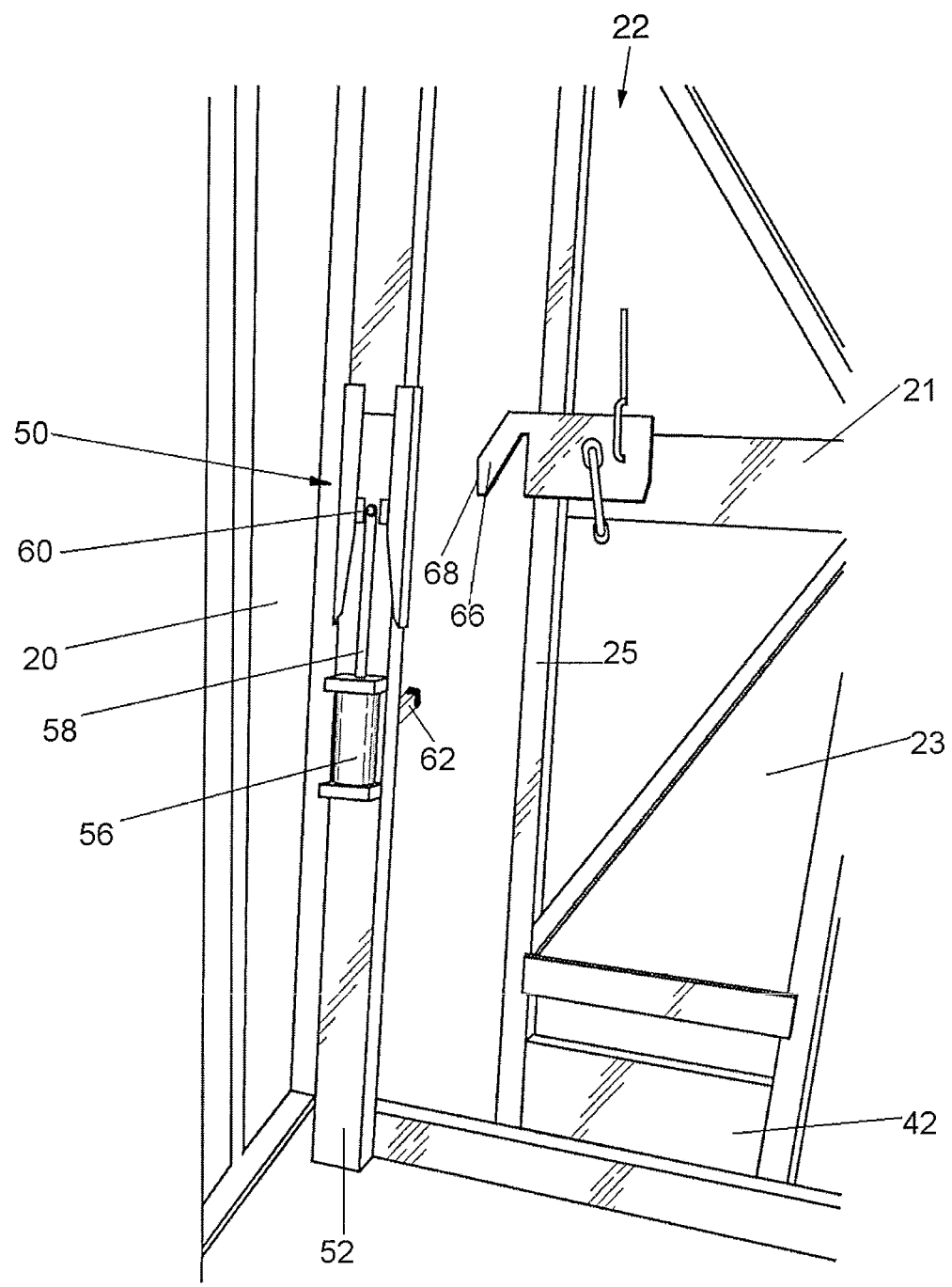
FIG. 3 shows a perspective view of a prior art open front closing mechanism of a retractable tarp system.
Figure 4:
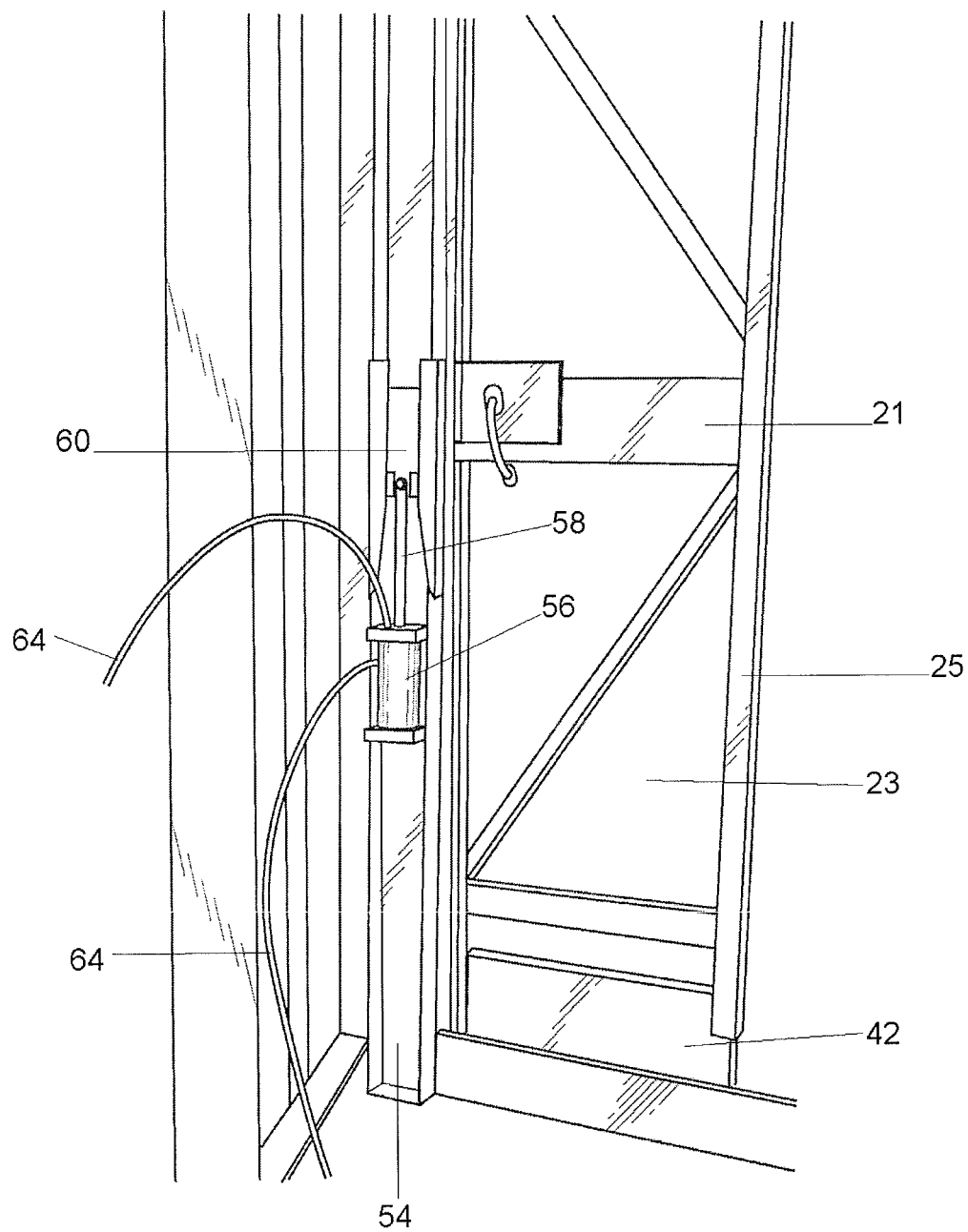
FIG. 4 shows a perspective view of a closed front closing mechanism of a retractable tarp system.
Figure 5:
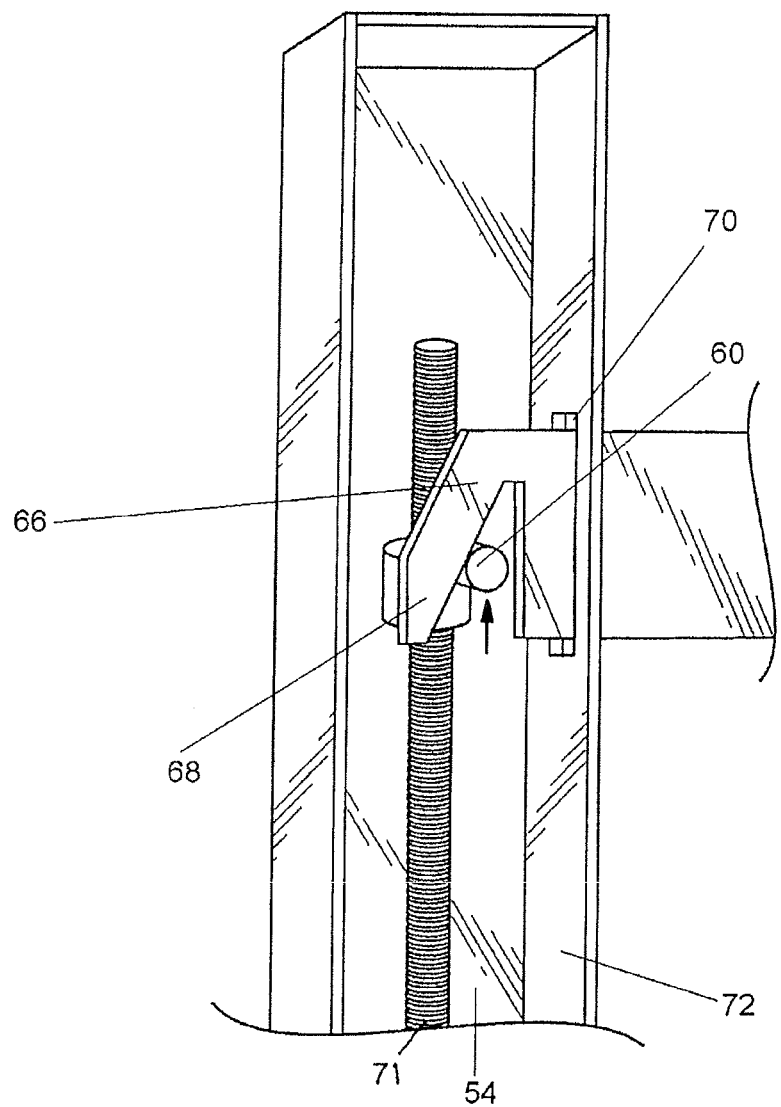
FIG. 5 shows a perspective view of a guide engaging a notch of a hook inside a channel.
Figure 6:
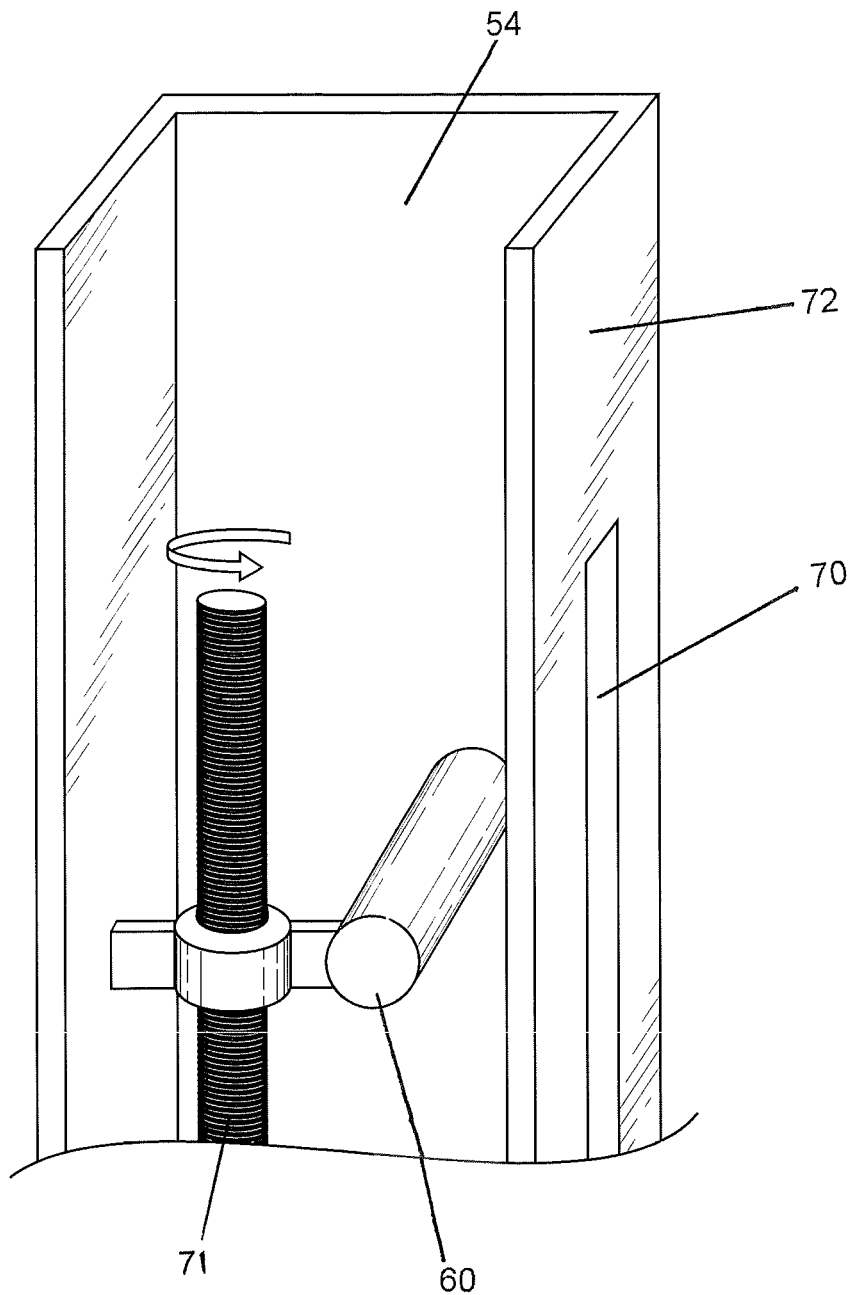
FIG. 6 shows a perspective view of an adjustable latch as the guide.

As shown in FIG. 3, a retractable tarp structure 22 includes an automated front closing mechanism 50, partially mounted on the headboard 20 of the trailer 24 or truck. The automated portion of the closing mechanism 50 is mounted on a beam 52 as shown in FIG. 3 or preferably a channel 54 as shown in FIGS. 4-6, such as a 5"×2.5" channel that faces inward on each side of the headboard 20.

An air cylinder 56 can be mounted associated with the headboard 20. The air cylinder 56 may be a two-way air cylinder with a piston rod 58 that moves a guide 60 up and down. A guide 60 is generally one half of a complementary attachment means. The front closing mechanism 50 has a switch 62 to open and close the closing mechanism 50. The switch 62 may be a toggle, button or the like so that the driver needs only to operate a switch, such as a toggle, to open and close the retractable tarp structure 22. In the toggle example, the driver only has to pull a toggle switch to open the closing mechanism 50 and push the toggle to close the closing mechanism 50 of a retractable tarp structure 22 without climbing on the trailer 24.

The automated closing mechanism 50 can use air cylinders 56, which preferably employ the trailer's own air supply via lines 64, which may be internal per FIG. 3. As such, the air cylinder 56 is connected to a compressed air source on the trailer 24 or a truck. High pressure air lines 64 can run from the compressed air source to the air cylinder 56. Also an automated closing mechanism 50 can be run by hydraulics, using corresponding hydraulic systems similar to the air systems described herein in detail. It could also be done using electric motors.

The tarp structure 22 as shown has an attachment front hook 66 mounted on a reinforcing rib 21 as an example with an end 68 that engages the guide 60, the front hook 66 cooperates with the guide 60 on the piston rod 58 of the air cylinder 56 to secure the tarp structure 22 to the headboard 20. While the system as shown has the front hook 66 on a portion of the cart 42 where the piston rod 58 goes up and down to lock or unlock the front hook 66 to the headboard 20, it is also within the scope of this disclosure where the piston moves one or more hooks up and down on the front headboard, and the hooks are secured into the cart to lock the cart to the headboard.

FIG. 4 shows a perspective view of a closed front closing mechanism 50 of a retractable tarp structure 22 that is primarily mounted in a channel 54 incorporated into the headboard 20 that is fixed to the trailer 24 or a truck. A two-way air cylinder 56 can be mounted on the headboard 20 at least partially within the channel 54, which is preferred to have channels 54 on each side of the headboard 20, each with an air cylinder 56. The air cylinder 56 has a piston rod 58 attached to a guide 60 that is slideable within the channel 54. The particular guide 60 can be a C-shaped channel bar adapted to slide up and down within the channel 54, of which only the back center portion of the channel bar is shown in FIG. 4. The rear leg of the C-shaped channel bar can be the portion that engages the front hook 66. To aid the movement of the channel bar within the channel 54, the channel bar example of the guide 60 can have an Ultra-High Molecular-Weight (UHMW) polyethylene cover. When air is applied to the air cylinder 56, the channel bar can slide with the UHMW covering up and down the channel 54.

In the channel example, a slot 70 can be cut into the rear flange 72 of the channel 54 at the appropriate height for the front hook 66 to pass through. The front hook 66 is mounted on a portion of the tarp structure 22 so it lines up to pass through the slot 70, as shown in FIG. 5 passing through the slot 70 in the rear flange 72 of the channel 54. As shown in FIGS. 5 and 6, threaded rod 71 can be used to move a guide 60 (shown as a latch bar) up and down. This guide 60 can lock into a front hook 66 that is on a portion of the cart 42. As a threaded rod is turned, the hook could also move up and down to catch or release corresponding recesses in a portion of the cart. The method could be extended to a system where a piston or threaded rod moves two hooks up and down, which can hook into the first cart to lock the cart to the headboard.

The front hook 66 extends from the tarp structure 22 with an end 68 adapted to engage the guide 60, which may be a latch bar as shown in FIGS. 5 and 6. The front hook 66 cooperates with the guide 60 on the piston rod 58 to secure the tarp structure 22 to the headboard 20. Preferably, the end 68 extends at a downward angle emanating from a top portion of the front hook 66. This allows the front hook 66 to be slightly pulled closed when the guide 60 slides upward.

In operation, the cart 42 with attached reinforcing ribs 21 and rib members 25 is rolled in track 44 near the headboard 20 so the end 68 of the front hook 66 on a reinforcing rib 21 is adjacent to the beam 52 or channel 54 associated with the headboard 20, preferably through a slot 70 in a rear flange 72. Air pressure can be applied to the air cylinder 56 to cause the guide 60 to slide up the beam 52 or channel 54 and engage the front hook 66 to fully close and secure the cart 42 and associated tarp structure 22 to the headboard 20 in a closed position. Compressed air from the air cylinder 56 drives the piston rod 58 causing the guide 60 to slide within the respective channel 54.

To open the tarp structure 22, air pressure can then be applied to the air cylinder 56, preferably the opposite end in a two-way air cylinder, to cause the guide 60 to slide down the beam 52 or channel 54 and disengage and release the front hook 66. The cart 42 can then be rolled away from the headboard 20 to the back of the trailer 24 or truck to load or unload cargo 29 from the trailer 24 or truck. These same considerations may be applied to a rear system operating with respect to a rear post 78.

Figure 7:
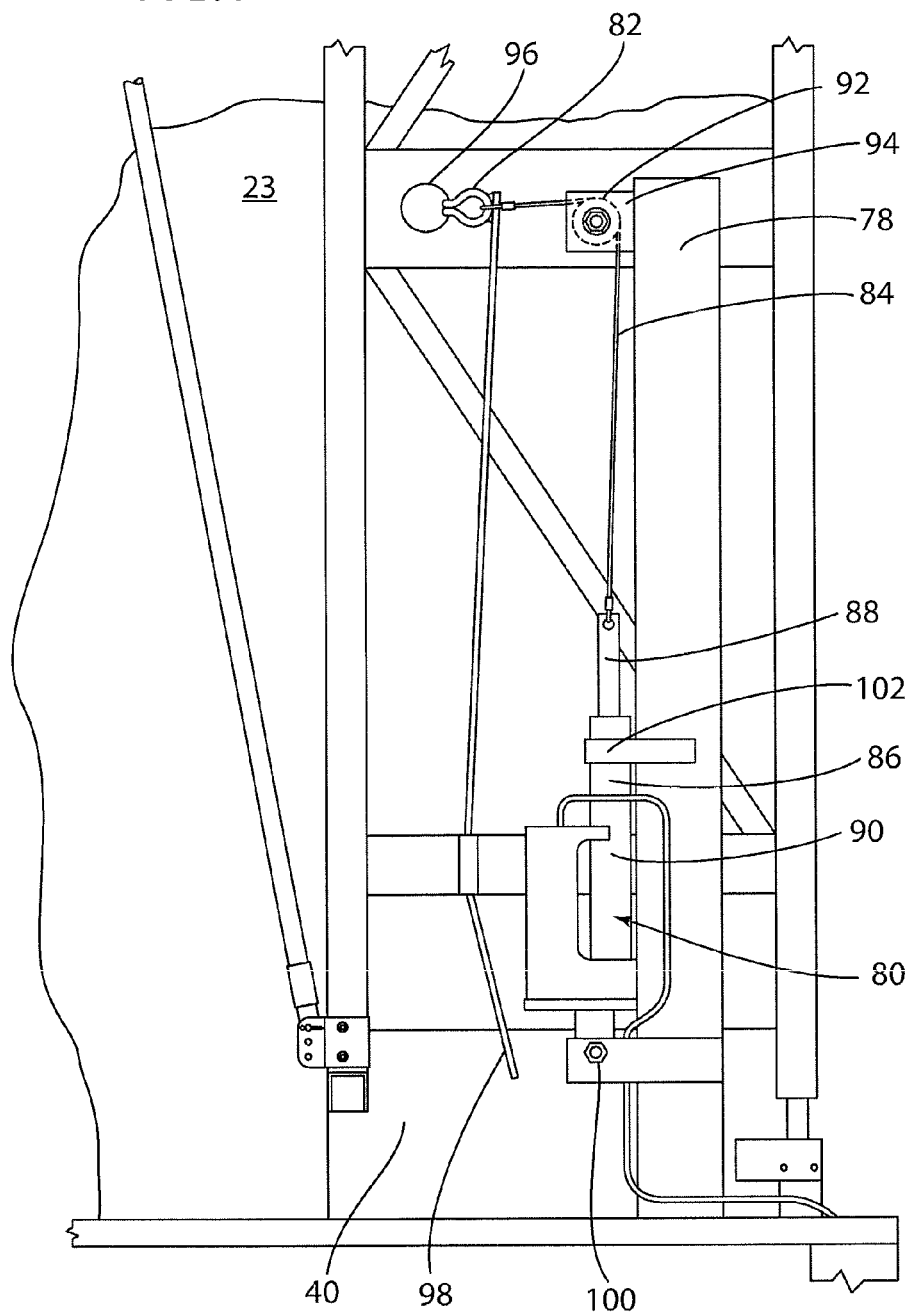
FIG. 7 shows the rear closure system with the hook connected to the tarp frame.
Figure 8:
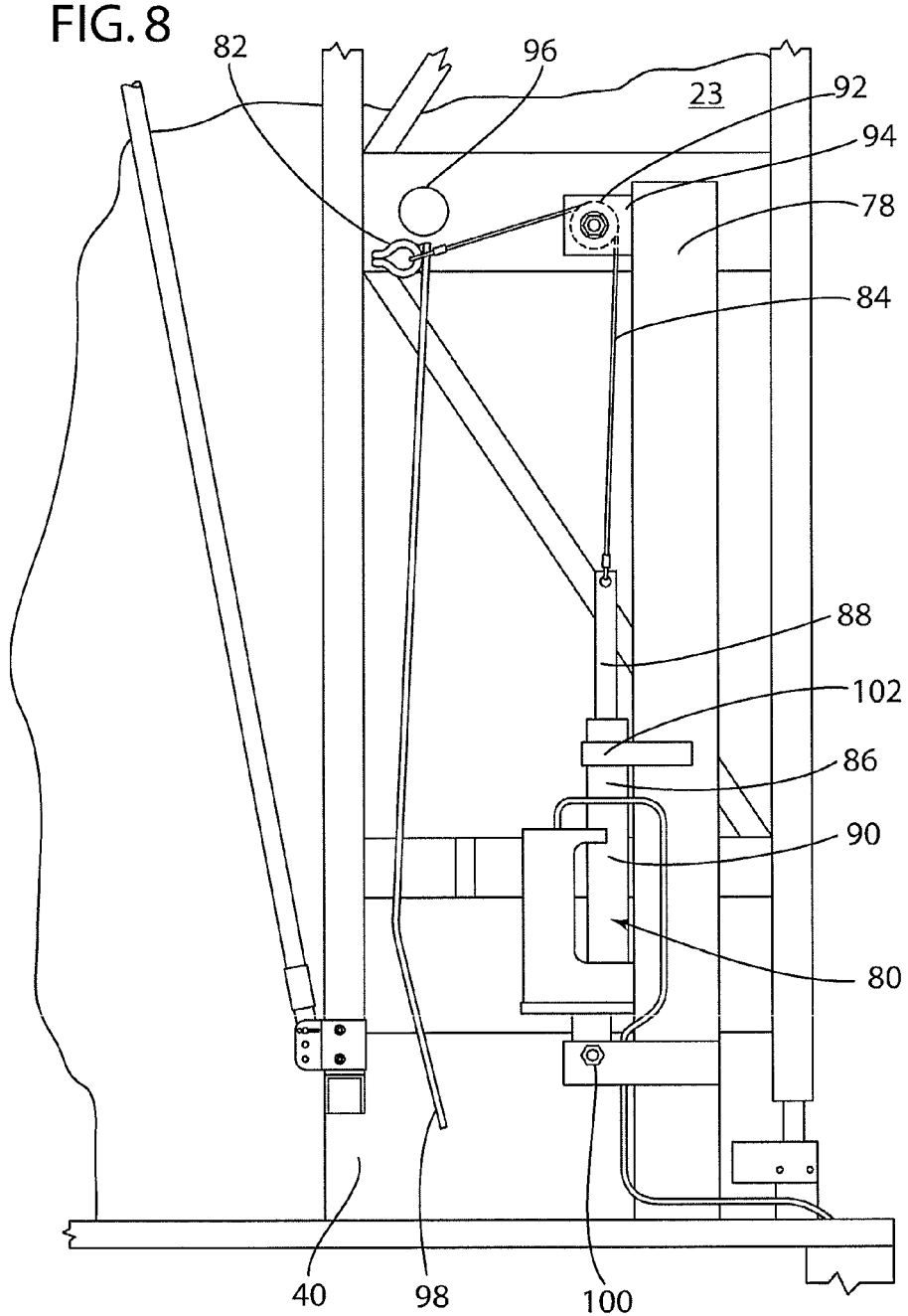
FIG. 8 shows the rear closure system with the hook disconnected from the tarp frame.

A rear closure system 80 is shown in FIG. 7 with a rear hook 82 connected to the tarp structure 22, which pulls the tarp 23 tightly so no ripples or waves exist in the tarp 23. FIG. 8 shows the rear closure system 80 with the rear hook 82 being disconnected from the tarp structure 22, which would allow the tarp 23 to be opened or more easily moved (to the left as shown) without tension applied.

The rear hook 82 is operated via a cable 84, such as aircraft cable, by a linear actuator 86. A sliding shaft 88 linearly moves within a fixed housing 90 of the linear actuator 86 to pull the rear hook 82 toward the rear to tighten the tarp 23. As shown in the FIGS. 7 and 8, a pulley 92 is mounted at the top distal end of the rear port 78, such as on a pulley holder 94, to redirect the cable 84 approximately ninety degrees.

The rear hook 82 is selectively attachable to the tarp structure 22 via a complementary attaching means 96, such as an aperture in the trolley 40 or other complementary hook receiver. A tool 98, such as a handle, bar, or stick, can assist the truck driver with any remote attaching or disengaging of the rear hook 82 with the attaching means 96, such as inserting the rear hook 82 to or removing it from an aperture as shown. The tool 98 is stowed in FIG. 7, and shown ready to use in FIG. 8.

The linear actuator 86 is preferably mounted on the rear post 78 on the side as shown with an actuator base 100 underneath the linear actuator 86 and an actuator support 102 securing the fixed housing 90 of the linear actuator 86.

The side mounting is preferred if the rear post 78 can pivot to be flat relative to the bed portion 26. Alternately, the rear post 78 can be removable with a disconnectable electrical plug. Each of these options, allow the rear posts 78 with the corresponding rear closing systems 80 to be out of the way when the trailer 24 is loaded. Also, such a rear closing system 80 mounted on a removable rear post 78 could be an integral component to retrofit on a deck 26 with a complementary hole to accept the rear post 78.

Figure 9:
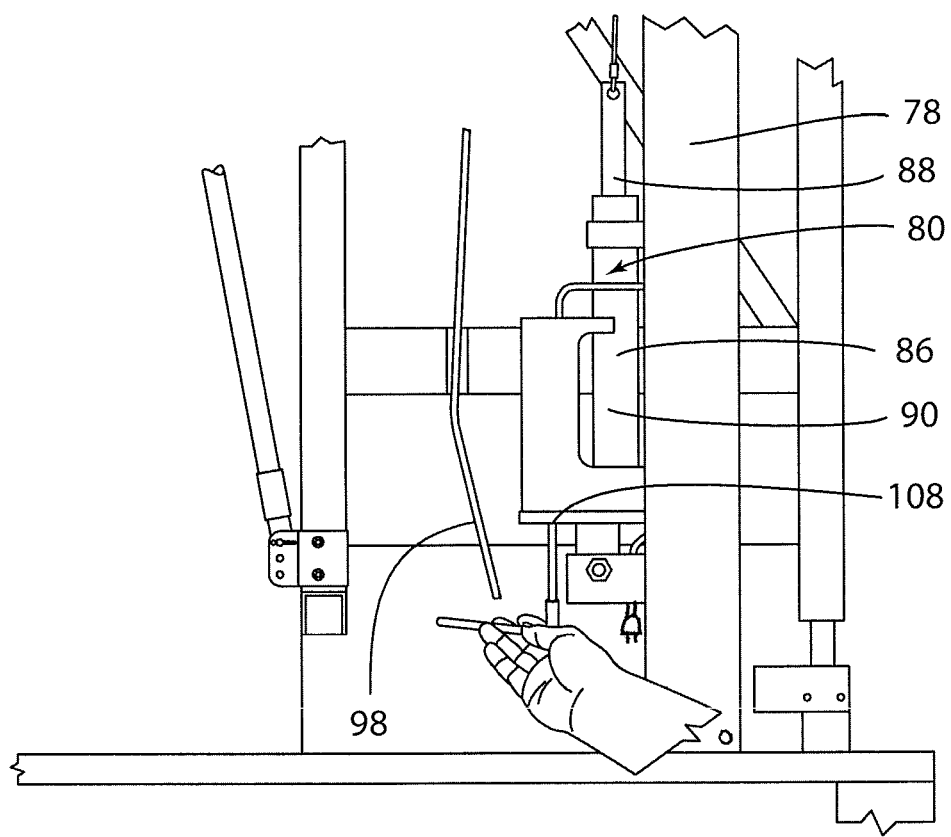
FIG. 9 shows an override for the rear closure system being made by a standard tool.

As shown in FIG. 9, each linear actuator 86 would preferably include an override 108 for the system in the event of a power failure so that the rear closure system 80 could be manually operated if ever needed. A standard tool as shown can be used to override the rear closure system 80. Also, the cable and actuator connector could be a quick release fastener.

The trolleys 40 slide on tracks on each longitudinal side of the deck 26, and the rear closing system 80 operates between the tracks. The rear closing system 80 would be enclosed by a closed tarp 23.

Figure 10:
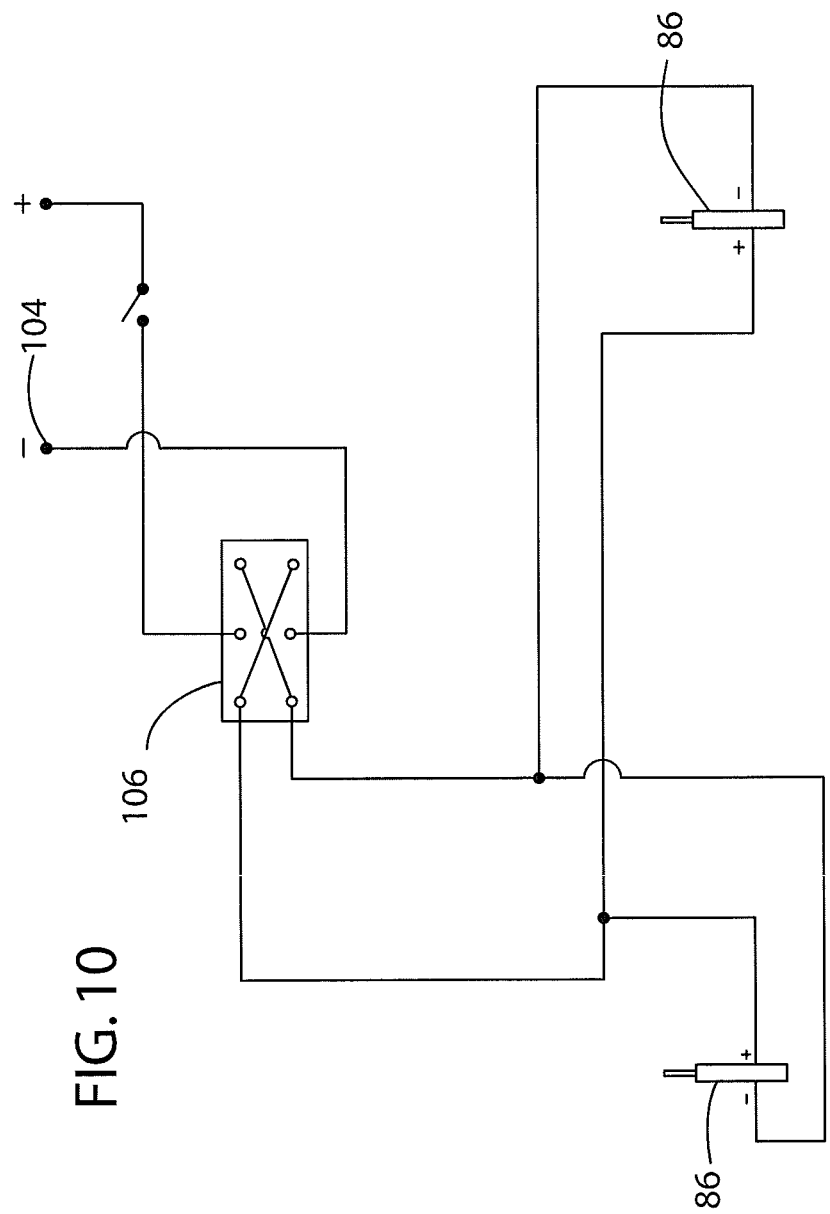
FIG. 10 shows a schematics diagram for an electric rear closure system.

FIG. 10 shows a schematics diagram for the rear closure system 80 for a preferred electric system. A power source 104, such as a battery, may be electrically connected via wires and a preferred automatic resettable breaker to a switch 106, such as a 30.0 Amp double pole, double throw (DPDT) switch (or two SPDT switches), to two linear actuators 86 that would be mounted with electrical motors on each left 26-*l* and right 26-*r* side edge of the bed portion 26. The switch 106 to operate the rear closing system 80 controls electric motors of two linear actuators.

The retractable tarp structure 22 can be opened, closed and secured from the ground for driver safety. The tarp 23 can cover or uncover cargo 29 in a few minutes with each switch 62 and 106 to simply open and close the closing mechanisms 50 and 80 to save dock time. The front closing mechanism 50 and rear closure system 80 are self-contained so no additional special tools are necessary.

The automated front closing system 50 can be air-operated and the rear closure system 80 can be electrical, but the principals of this disclosure can be used with hydraulic systems and any combination of pneumatic, hydraulic or electrical systems for the front or rear closure systems of the trailer.

The retractable tarp structure 22 is best suited for a flat bed trailer 24, but it can be used on flat bed trucks or portions of other vehicle-pulled trailers wherein the tarp structure 22 is secured to a headboard 20 or rear posts 78 with various slider side tarping systems.

This disclosure has been described as having exemplary embodiments and is intended to cover any variations, uses, or adaptations using its general principles. It is envisioned that those skilled in the art may devise various modifications and equivalents without departing from the spirit and scope of the disclosure as recited in the following claims. Further, this disclosure is intended to cover such variations from the present disclosure as come within the known or customary practice within the art to which it pertains.

What is claimed is:

1. A retractable tarp system with dual automated closing mechanisms used in conjunction with a truck or trailer having a deck with two sides and a front and rear end, the tarp system comprising:
    a tarp structure that slides on the sides of the deck;
    an automated front closing mechanism at the front end of the deck;
    an automated rear closing mechanism at the rear of the deck having a linear actuator on each side with a tensioning cable having a hook on a distal end, each hook is selectively attachable to the tarp structure; and
    switches to operate the closing mechanisms,
    wherein the linear actuators can pull the cable and hook to tighten the tarp structure toward the rear.

2. The tarp system of claim 1 wherein the automated front closing mechanism operates with air cylinders connected to a compressed air source on the trailer and the automated rear closing mechanism operates with electric motors operating the linear actuators connected to an electrical system of the truck.

3. The tarp system of claim 1 wherein each linear actuator is mounted on a rear post on each side of the deck with a pulley on the distal end of each rear post to redirect the respective tensioning cable.

4. The tarp system of claim 1 wherein an attachment on the tarp structure is an aperture on a rolling trolley to which the hook can engage.

5. The tarp system of claim 1 wherein the switch to operate the rear closing mechanism is a double pole, double throw switch that controls electric motors in two linear actuators.

6. The tarp system of claim 1 wherein the tarp structure slides on tracks on each longitudinal side of the deck and the rear closing mechanism operates between the tracks.

7. The tarp system of claim 1 having a tarp structure with a front hook on an edge of the tarp structure with an end extending at a downward angle emanating from a top portion of the front hook to allow the front hook to be pulled closed toward the front.

8. The tarp system of claim 3 wherein the rear posts with the corresponding rear closing mechanism with disconnectable power are removable from the deck.

9. A retractable tarp system used in conjunction with a truck or vehicle-pulled trailer having a deck, the retractable tarp system comprising:
    a tarp surrounding a tarp structure that slides on tracks on each side of the deck,
    a cart trolley slideable in each track having an attachment means, and
    a automated rear closing mechanism between the tracks at the rear of the deck having a linear actuator on each side of the deck with a tensioning cable having a hook on a distal end of the cable, a switch to operate the automated rear closing mechanism,
    wherein each hook engages the respective attachment means when the linear actuators pull each cart trolley via the respective cable to tighten the tarp to the rear.

10. The tarp system of claim 9 wherein the attachment means is an aperture on the cart trolley to which the hook can selectively disengage when the tarp is not tightened.

11. The tarp system of claim 10 wherein each linear actuator is mounted on a rear post on each side of the deck with a pulley on the distal end of each rear post to redirect the respective tensioning cable.

12. The tarp system of claim 9 further comprising an automated front closing mechanism at the front end of the deck that tightens the tarp forward.

13. The tarp system of claim 9 wherein the switch to operate the rear closing mechanism is a double pole, double throw switch that controls electric motors in two linear actuators.

14. The tarp system of claim 11 wherein the rear post with the corresponding rear closing system with a disconnectable electric plug are removable from the deck as an integral unit.

\* \* \* \* \*